US006630563B2

(12) United States Patent
Hucks et al.

(10) Patent No.: US 6,630,563 B2
(45) Date of Patent: Oct. 7, 2003

(54) PROCESS FOR CONTINUOUS PRODUCTION OF POLYCARBONATES AND A REACTOR THEREFOR

(75) Inventors: Uwe Hucks, Alpen (DE); Thomas König, Leverkusen (DE); Silke Kratschmer, Krefeld (DE); Eike Schulz Van Endert, Berlin (DE); Klaus Schröder, Berlin (DE); Hans-Peter Hoffmann, Velten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/127,786

(22) Filed: Apr. 22, 2002

(65) Prior Publication Data

US 2002/0188091 A1 Dec. 12, 2002

(30) Foreign Application Priority Data

Apr. 24, 2001 (DE) .......................... 10119851

(51) Int. Cl.$^7$ .............................................. C08G 64/00
(52) U.S. Cl. ....................... 528/196; 422/131; 428/64; 428/411.1; 528/196; 528/198
(58) Field of Search ................ 428/64, 411.1; 422/131; 528/196, 198

(56) References Cited

U.S. PATENT DOCUMENTS

| | | | |
|---|---|---|---|
| 3,022,272 A | 2/1962 | Schnell et al. ................ 260/47 |
| 3,684,458 A | 8/1972 | McCammon et al. ......... 23/285 |
| 5,055,536 A | 10/1991 | Dubois ....................... 526/194 |
| 5,334,358 A | 8/1994 | Schuchardt et al. ........ 422/210 |
| 5,340,905 A | 8/1994 | Kühling et al. ............. 528/199 |
| 5,399,012 A | 3/1995 | Schuchardt et al. .......... 366/97 |
| 5,399,659 A | 3/1995 | Kühling et al. ............. 528/199 |
| 5,498,688 A | 3/1996 | Oshino et al. ............... 528/198 |
| 5,599,507 A | 2/1997 | Shaw et al. .................. 422/135 |
| 5,767,224 A | 6/1998 | Kühling et al. ............. 528/196 |
| 5,779,986 A | 7/1998 | van Endert et al. ......... 422/136 |
| 5,816,697 A | 10/1998 | Nogata et al. ............. 366/76.1 |
| 5,912,289 A | 6/1999 | Komiya et al. ............. 524/153 |
| 5,912,318 A | 6/1999 | Hasegawa et al. .......... 528/196 |
| 5,932,683 A | 8/1999 | Hachiya et al. ............. 528/196 |
| 6,265,525 B1 | 7/2001 | Kinoshita et al. ........... 528/196 |
| 6,339,138 B1 | 1/2002 | van Hout et al. ............ 528/196 |

FOREIGN PATENT DOCUMENTS

| | | |
|---|---|---|
| DE | 1031512 | 6/1958 |
| GB | 1007302 | 10/1965 |
| GB | 1 435 767 | 5/1976 |

OTHER PUBLICATIONS

Chemistry and Physics of Polycarbonates, by Hermann Schnell, Polymers Reviews, vol. 9, (month unavailable) 1964, pp. 44–51.

*Primary Examiner*—Terressa M. Boykin
(74) *Attorney, Agent, or Firm*—Joseph C. Gil; Aron Preis

(57) ABSTRACT

A process for producing polycarbonate is disclosed. The process entails obtaining an oligocarbonate produced by transesterification of diaryl carbonate with dihydroxyaryl compound in the presence of catalysts and introducing the oligocarbonate into a reactor that enables continuous formation of free films at a rate higher than 10. The reactor including a horizontal cylinder equipped with a heating jacket, at least one vapor outlet, a feed nozzle an outlet nozzle, a rotatable cylindrical basket having a cylindrical perforated wall and annular discs positioned at intervals around the periphery of said basket and along the length thereof, and means for rotating said basket, the interior of said basket including no central shaft, the diameter of the cylindrical basket corresponding to about $\frac{2}{3}$ of the diameter of the horizontal cylinder, and said discs being formed of perforated sheet metal.

8 Claims, 2 Drawing Sheets

PROCESS FOR CONTINUOUS PRODUCTION OF POLYCARBONATES AND A REACTOR THEREFOR

FIELD OF THE INVENTION

The invention relates to a process for continuous production of polycarbonates and to a reactor particularly suitable for this purpose.

SUMMARY OF THE INVENTION

A process for producing polycarbonate is disclosed. The process entails obtaining an oligocarbonate produced by transesterification of diaryl carbonate with dihydroxyaryl compound in the presence of catalysts and introducing the oligocarbonate in molten state into a reactor that enables continuous formation of free films at a rate higher than 10. The reactor, operating under conditions calculated to promote polycondensation, includes a horizontal cylinder equipped with a heating jacket, at least one vapor outlet, a feed nozzle an outlet nozzle, a rotatable cylindrical basket having a cylindrical perforated wall and annular discs positioned at intervals around the periphery of said basket and along the length thereof, and means for rotating said basket, the interior of said basket including no central shaft, the diameter of the cylindrical basket corresponding to about $2/3$ of the diameter of the horizontal cylinder, and said discs being formed of perforated sheet metal.

BACKGROUND OF THE INVENTION

Oligocarbonates are produced by transesterification of diaryl carbonates with dihydroxyaryl compounds in the presence of catalysts. Processes for the production of polycarbonates are described in the documents DE-A-1 031 512, U.S. Pat. No. 3,022,272, U.S. Pat. No. 5,340,905, U.S. Pat. No. 5,399,659, DE-A 4 312 390, U.S. Pat. No. 5,912,318, U.S. Pat. No. 5,932,683, U.S. Pat. No. 5,912,289, WO 00/26 276 and EP-A 620 240 in which the production of the intermediate stages, the oligocarbonates, is illustrated. A process for direct production of oligocarbonates is described in the German application No. 1 01 14 808.9. Further details of the melt transesterification process in general are found in the literature (see for example Hermann Schnell, Chemistry and Physics of Polycarbonates, Polymer Reviews, Vol. 9, 1964, pages 44 to 51).

Various devices for the polycondensation of oligocarbonates are described.

A helical spiral for a horizontal cylinder or a horizontal reaction pipe which spreads and conveys the melt on the reactor wall is proposed in DE-A 1 495 730 (Farbenfabriken Bayer AG). A disadvantage is that, owing to gravitation, the upper housing walls are only partially wetted and products are therefore damaged. A stable design of the spirals for large scale plant is very doubtful.

EP-A 0 711 597 (Hoechst Celanese Corporation and Hoechst AG) proposes a horizontal cylinder with a stirrer rotating therein without a centre line as a reactor device for polyester. The supporting connection elements are located on the external periphery of the stirrer. A disadvantage here is the external supporting structure, as it may lead to film bridges which may form closed chambers with the films on the stirrer blades and then impair optimal removal of the cleaved compounds. The effective treatment of higher viscosity melts is also affected as the ratio of film surface to melt volume is considerably reduced and impaired owing to the increasingly thick melt coatings.

EP-A 0 778 078 (Teijin Limited) describes a twin shaft reactor for polycondensation. Here the reaction chambers are narrow and production is difficult owing to the restricted play. Therefore, the overall dimensions are limited and are not suitable for high throughputs. Furthermore, energy is introduced via the drive and this leads to undesirable rises in temperature.

U.S. Pat. No. 5,932,683 (Asahi Kasei Kogyo Kabushiki Kaisha) describes a reactor device in which the oligocarbonate melt is distributed via a perforated disk onto a plurality of vertically attached wires and runs down them into the sump. In example 1, 50 wires 8 m in length are required for just 5 kg prepolymer per hour. It is clear that these are very complex structures which are difficult to produce on a large scale. Nitrogen is used in addition to the vacuum to aid the progress of the reaction and subsequently has to be liberated from the phenol in complex operations.

U.S. Pat. No. 5,767,224 (Bayer AG) proposes a reactor with kinematic self-cleaning for polycondensation of oligocarbonates. This reactor is described in EP A 460 466, EP A 528 210 and EP A 638 354. For high throughputs in large-scale plant this construction is very expensive and, owing to the restricted play, limited in its overall size. Furthermore, energy is introduced by the drive and this leads to undesirable rises in temperature. As inappropriate average residence times are possible, basic alkali, alkaline-earth and transition metal hydroxides, alkoxides, carbonates, acetates, boranates, phosphates and hydrides are used as catalysts in order to reduce the reaction times. However, these have an adverse effect on the quality of the polycarbonate formed.

WO-A 99/28 370 (Hitachi, Ltd.) describes a reactor or reactor device consisting of horizontal cylindrical containers which are equipped with single or twin shaft stirrers. They have good cascade characteristics and reduce the production costs compared with stirred tank cascades. A disadvantage is the external supporting structure in the single shaft stirrer, as it may lead to film bridges which may form closed chambers with the films on the stirrer blades and then impair optimal removal of the cleaved compounds. The use of twin shaft stirrers is proposed for higher viscosities. The single shaft stirrer forms excessively thick films at higher viscosities. As a result, the film surface or material exchange area is drastically reduced and the reactor does not operate effectively. In the reactor with twin shaft stirrers this deficiency is remedied by the mixing energy which is converted into kneading work. However, the drawback of a high ratio of surface area to volumetric content still exists. Another disadvantage is the energy which is introduced by the kneading work and leads to undesirable rises in temperature.

The object of all reactor devices is to provide the residence time and surface or surface renewal required for progress of the reaction. Kneading work is necessary for surface renewal, particularly at higher viscosities. The residence time required is substantially influenced by the use of catalysts and by the surface area or intensity of surface renewal over which evaporation of monohydroxyaryl compound and diaryl carbonate takes place.

In reactors with shorter residence times, an attempt is made to accelerate the reaction by using basic alkali, alkaline-earth and transition metal hydroxides, alkoxides, carbonates, acetates, boranates, phosphates and hydrides as catalysts and optionally by elevated temperatures, and to bring about sufficient surface renewal, for example by intensive kneading work. However, the use of these catalysts does not have a favourable effect on the quality of the polycarbonate formed as they remain in the product.

Elevated temperatures in the presence of the above-mentioned transesterification catalysts are particularly disadvantageous to the colour of the product. The kneading work required may only be brought about by reinforced reactor constructions with high power inlet. Reactor devices of this type cannot be built in any size and this adversely affects economical throughput rates.

The object was therefore to find a reactor design which, on the one hand, permits particularly good evaporation of the monohydroxyaryl compound and optionally the diaryl carbonate by creating large melt surfaces, but, on the other hand, still allows the high throughputs desired nowadays, may be mass produced and may be operated economically.

DETAILED DESCRIPTION OF THE INVENTION

The object has surprisingly been achieved by reactor devices which continuously form free films under the influence of gravity and have a high film-forming rate. The film-forming rate is defined here as the ratio of the amount of material per unit time which is drawn up by the cylindrical basket (described below) and flows downwardly in the form of a free film, to the total throughput of the reactor. This film-forming rate should be at least 10, but preferably higher than 15 and particularly preferably higher than 20.

Figure 1:
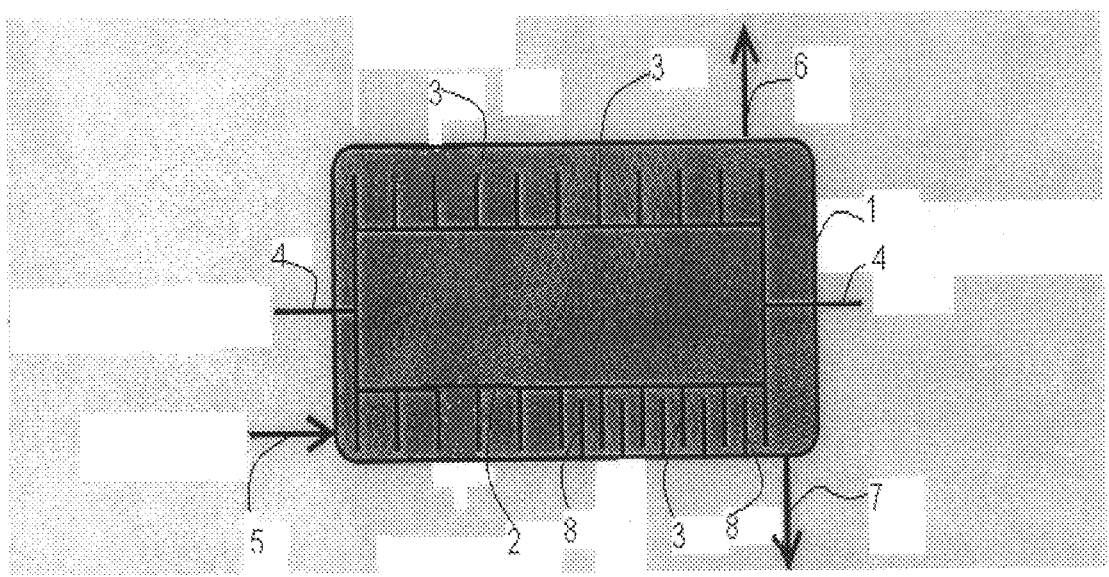
FIG. 1 is a schematic longitudinal cross sectional view of the reactor.

In a preferred embodiment of the reactor and in reference to FIG. 1, the reactor includes a reactor housing in the form of a horizontal cylinder, 1, equipped with a heating jacket (not shown) one or more vapour outlets, 6, along the upper side of the cylinder, a feed nozzle, 5, on the inlet side of the cylinder, preferably fitted in the end face at the bottom, and an outlet nozzle, 7, on the outlet side of the cylinder, the outlet nozzle preferably being fitted at the bottom. The position of the feed nozzle or outlet nozzle is not critical to the invention and may therefore also be at other locations, but always on the inlet and outlet side.

The horizontal cylinder as reactor housing contains a rotatable cylindrical basket (inner cylinder) 2, which is mounted via shaft ends, 4, in the covers at the cylinder end faces of the horizontal cylinder and may be driven, i.e. set into rotation, from the exterior (not shown).

The cylindrical basket contains no solid continuous central shaft, the wall of the cylindrical basket is formed from perforated sheet metal. The cylindrical basket has a diameter corresponding to about ⅔ of the diameter of the cylinder forming the reactor housing. Annular disks, 3, produced from perforated sheet metal are fitted round the periphery of the cylindrical basket. The internal diameter of the annular disks corresponds to the external diameter of the cylindrical basket on to which the annular disks are fastened. The external diameter of the annular disks is somewhat smaller than the diameter of the cylinder forming the reactor housing, so the vapours formed may escape. The cylindrical basket and the perforated disks fitted thereon are together referred to as a rotor. In a particular embodiment, further annular disks made of perforated sheet metal may be fitted on the interior of the cylindrical basket. The external diameter of these annular disks then corresponds to the internal diameter of the cylindrical basket and the internal diameter of the annular disks is no less than ⅓ of the diameter of the cylinder forming the reactor housing.

An eccentric mounting of the rotor, i.e. somewhat below the centre line of the outer cylinder so a somewhat greater gap for the escaping vapours is obtained at the top, is advantageous.

Both the spacing between the several annular disks and the size of the perforations in the annular disks may be made proportional to the melt viscosity that varies along the length of the reactor and both the spacing and the sizes of the perforations increase with increased viscosity of the polymer from the inlet side to the outlet side of the reactor. About 6 to 15, preferably 8 to 12 annular disks are fitted per meter of rotor length.

The reactor is about ⅓ filled with molten material. During rotation, the annular disks and also the cylindrical basket made of perforated sheet metal are drawn through the melt. As they emerge, the melt flows downward and forms the continuously stretching films which thus enabling evaporation of the relevant monomers.

The reactor is fed via the feed nozzle at the end face of the reactor cylinder with low-molecular weight oligomeric product which, after condensing in the reactor to form polymeric resin that is removed via the outlet nozzle.

At higher viscosities, i.e., at viscosities over about 100 Pas, stators, 8, may be positioned between the annular disks. These stators that limit the loading of the rotating basket with molten material may be fastened to the inner wall of the reactor cylinder.

The vapours formed in the course of condensation are guided off upwardly via the vapour outlets.

The present application also relates to this reactor.

The annular disks are perforated circular rings having a ratio of the total surface area of the ring to the area taken up by the solid webs between the holes of 2.2 to 6.5, preferably of 2.5 to 5. The ratio between the surface area of the solid webs between the holes in the annular disks and the total volume of the reactor is 25 to 5, preferably 20 to 9 m$^2$ per m$^3$. At higher viscosities toward the end of the process, the value may be 15 to 5, preferably 8 to 12 m$^2$ per m$^3$.

It has proven advantageous to enable the size of the films to increase with the viscosity, i.e., as stated above, the area of the holes increases with the viscosity of the product, in other words the size of the holes increases as one progresses from the inlet side to the outlet side of the reactor. In contrast to the ideal design, therefore, a plurality of disks with equal hole size may be mounted in succession, before changing to disks with the next greater hole size, of which a plurality may similarly be mounted in succession, etc. The holes in any annular disc may have any geometric configuration provided however that the area of a hole is determined as a function of the viscosity of the polymer in the relevant section of the reactor. Accordingly the area of an equivalent circular hole is a function of the viscosity as $A = x(\eta^2/(kg^2 m^- s s^{-2}))^{1/3}$. wherein A is the equivalent circular hole diameter and the dimensionless numerical factor x is 0.002 to 0.030, preferably 0.004 to 0.016. $\eta$ is the kinematic melt viscosity in Pas.

The holes may be designed with various geometric shapes. Holes in the form of equilateral symmetrical n-angled polygons, which permit constant web widths of the circumscribing metal faces, and rectangles are preferred. This leads to constant enveloping loading of the holes with molten material so uniform film formation occurs in the holes of the annular disk during rotation of the rotor.

Different shapes may be used at the inner and outer rim of the annular disks in order to be able to form a circular rim.

At high viscosities the equivalent hole diameter is so large that the inner and outer rim have to be divided by spokes, optionally subdivided even by a central ring. These holes are then delimited by the spokes or spoke segments and ring segments.

All of the metal faces or webs surrounding the holes are advantageously square or rectangular in cross-section. By selecting suitable web widths, the ratio of the area carrying the melt when the annular disk emerges from the melt to the surrounding hole may best be adapted to the melt viscosity and other properties of the melt. It has proven advantageous with an annular disk to select all the metal faces or webs surrounding the holes so as to have constant identical dimensions. This also leads to constant enveloping loading of the holes with molten material so uniform film formation occurs in the holes of the annular disk during rotation of the rotor.

Figure 2:
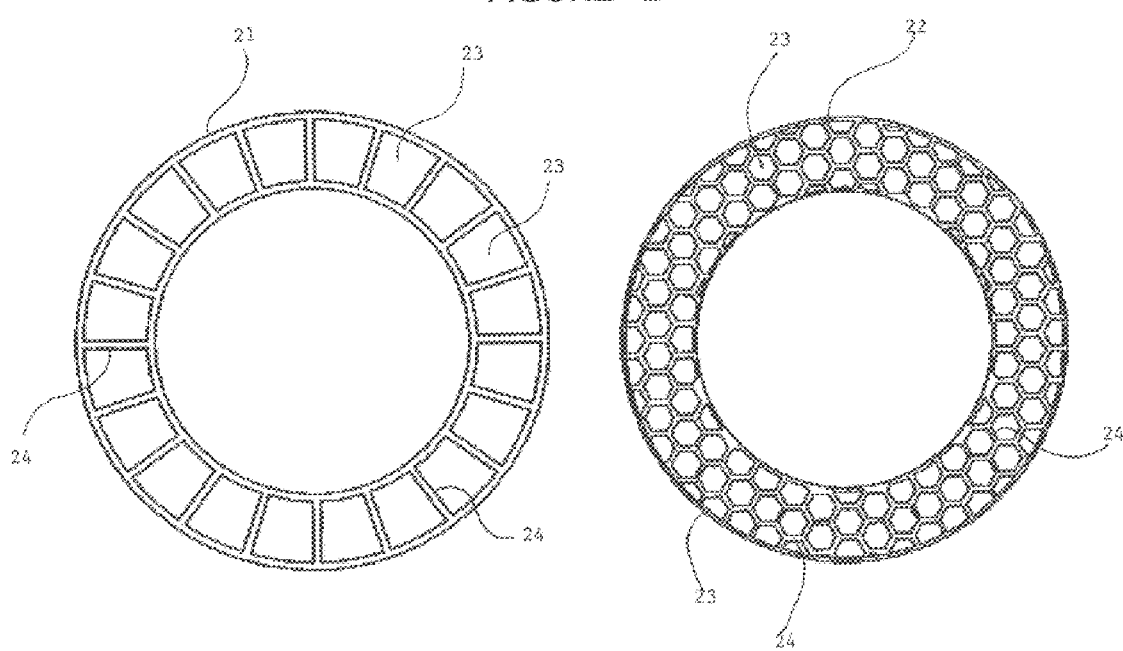
FIG. 2 shows annular discs.

Two annular disks shown schematically in FIG. 2 are illustrative.

In FIG. 2, the disc 22 represents a typical perforated disk of the type used, in the reactors according to the invention. The disk 21 is an example of a typical design for the discs used in the locals of the reactor where the viscosity of the polymer is in the higher range when only spokes and outer rims are provided because the necessary hole size abuts against the boundaries of the disk. 23 refers to perforations (holes); 24 refers to webs.

During production of different polycarbonates, various viscosity profiles may be expected in the reactor. The perforated disks are to be provided in the above-mentioned relationship in the reactor and adapted to the viscosity trend in the reactor.

In principle, polycondensation of the oligocarbonate may be carried out in one reactor. However, it may be expedient to arrange two or more reactors in succession as the final molecular weight to be attained is determined by the reaction equilibrium which depends on the temperature, pressure and the terminal group contents of the polycarbonate. At insufficient pressures the monomers to be drawn off may scarcely be condensed or may not be condensed at all and this leads to expensive, over-size vacuum systems. However, the advantage of low pressures is that the reaction temperature which, in conjunction with the residence time, determines quality, may be reduced. By distribution, for example, between two reactors, the gas exposure, minimised by different pressures and optionally by partial condensation of cleaved and evaporated compounds, the vacuum systems and the heat exposure of the product may be optimised. The molecular weight level of the starting oligomer and the amounts, yet to be evaporated, of products to be cleaved to the final molecular weight is also significant here.

The pipelines connecting the plurality of reactors should be as short as possible and the curvatures of the pipes kept as low as possible. The external constraints of the plant construction should be taken into account in the process.

It has been found that a particularly preferred reactor device for polycondensation of oligocarbonates is a horizontal cylindrical container with a stirrer, as described in DE 44 47 422 C2 (Karl Fischer Industrieanlagen GmbH), column 1, line 63 to column 7, line 39. This reactor does not have the drawbacks of the above-described reactor devices and may be built for very high throughputs.

Of particular advantage is the extremely rigid construction and design of the cylindrical basket supporting the perforated disks and of the cylindrical basket. The cylindrical basket is also provided with apertures or holes, so the resulting vapours may escape unimpeded. The nature of the rotor mounting allows the reactor to be operated at various temperatures zones and thus a temperature profile adapted to the progress of the reaction to be adjusted. The construction also limits entrainment of higher viscosity melts upon rotation of the rotor owing to the installation of stators which project between the disks. The ratio of melt surface to melt volume on the disk is optimised, particularly in the higher viscosity range, as a result of this measure.

For optimal and therefore preferred use of the reactor device illustrated in DE 44 47 422 C2 for the production of polycarbonates, however, further modifications are required over the constructions illustrated in the above-mentioned application.

In the instances where there is insufficient wetting of the rotating circular disk at the inlet to the reactor device at low viscosities. It has proven advantageous to equip up to half the reactor length with scoop elements on the outer periphery of the cylindrical basket in such a way that upon ascent of the scoop elements the circular disk is deliberately continuously washed with the low-viscosity melt.

In the high-viscosity range, i.e., the viscosities exceed a range of about 100 Pas, toward the end of the reactor, excessive entrainment of product by the rotating annular disk may lead to undesirable conditions, such as interruptions in film-formation. A method of preventing this, which is improved over DE 44 47 422 C2, is to attach horizontal stripping beams to the stators at the level of the sump. Convergence of the melt downstream of this beam in the direction of rotation of the rotor is therefore avoided. These beams may be attached directly to the housing or may be supported by optional additional beams which are also fastened to the wall of the reactor. A stripping beam and/or support beam design which promotes conveying may be selected for this purpose, as described in DE 44 47 422 C2. It is particularly significant and advantageous in aiding conveyance of the melt toward the reactor outlet.

For the progress of the reaction and the quality of product obtained, it is advantageous to divide the reactor into a plurality of preferably vertically disk-shaped zones which may be heated separately from one another, so a temperature profile adapted to the molecular weight trend may be followed. The heat exposure of the polycarbonate may therefore be minimised and this generally has a positive effect on properties such as the colour of the polycarbonate.

A further alternative or additional possibility is to heat the vapour or gas region differently from the melt or sump region located therebelow, i.e. to construct the vapour or sump chamber so as to be heated separately. Thus it is advantageous to heat the upper gas region less than the melt region located therebelow. Possible polycarbonate films on the walls in the gas region reside for a long time and are therefore damaged less by lower temperatures. To this end, heating of the sections of the reactor may advantageously be horizontally separated accordingly. This measure leads to higher reactor running times, less pinholing owing to cracked products and improved end product colours.

The processing temperatures for polycondensation are generally between 250 to 330° C., preferably 260 to 310° C., the pressures between 0.01 to 15 mbar, preferably 0.05 to 10 mbar and the mean residence times 30 to 240 minutes, preferably 60 to 180 minutes.

If the temperatures of the oligocarbonate melts introduced into the reactor are significantly lower than the desired operating temperature of the reactor it may be expedient to heat the melt prior to entry into the reactor using heat exchangers suitable for polymer melts. As a result the temperature differences between heating means and product in the reactor may be reduced in order to avoid product damage on the walls of the reactor.

According to the invention the product is introduced into the reaction device via a valve with automatic pressure control in a manner such that direct decompression occurs in the product chamber at the inlet side of the reactor. Cooling effects which may have drawbacks in view of particle contents of a crystalline nature are avoided owing to the high heating potential of the immediate surroundings. To this end the product inlet valves are attached, for example, to the end face of the reactor.

It is advantageous to displace the vapour outlets on the upper side of the reactor housing so as to be 15° to 60° off the vertical in the direction of rotation of the rotor in order to reduce the reflux of melts.

Any conventional materials, which do not lead to product damage, may be used to produce and manufacture the reactors, apparatus and heat exchangers as well as the pumps, pipelines and fittings. However, it has been found that the use of stainless steels of the Cr Ni (Mo) 18/10 type such as 1.4571 or 1.4541 (Key to Steel 2001, published by: Stahischlüssel Wegst GmbH, Th-Heuss-Straße 36, D-71672 Marbach) and Ni basic alloys of the C-type such as 2.4605 or 2.4610 (Key to Steel 2001, published by: Stahischlüssel Wegst GmbH, Th-Heuss-Straße 36, D-71672 Marbach) is particularly suitable. Stainless steels of the Cr Ni (Mo) 18/10 type are used up to processing temperatures of about 290° C. and Ni basic alloys of the C-type at processing temperatures above about 290° C. The selection of suitable materials for producing the reactors is particularly important for product quality.

It has surprisingly been found that the use of the reactor device illustrated is particularly well suited to industrial production of polycarbonates of very high quality from oligocarbonates of the type produced, for example, by the procedure illustrated in German application No. 1 01 14 808.9 by transesterification of diaryl carbonates with dihydroxyaryl compounds in the presence of catalysts. The very good colour qualities of the polycarbonates obtained are particularly surprising.

The melt transesterification process proceeds in a known manner from dihydroxyaryl compounds, diaryl carbonates and optionally branching agents and/or monohydroxyaryl compounds.

Dihydroxyaryl compounds suitable for production of oligomers are those of formula (I):

HO—Ar—OH  (I)

in which Ar is an aromatic radical with 6 to 30 C atoms, which may contain one or more aromatic nuclei, may be substituted and may contain aliphatic or cycloaliphatic radicals or alkyl aryls or heteroatoms as bridging elements.

Examples of dihydroxy compounds of formula (I) are
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
α,α'-bis-(hydroxyphenyl)-diisopropylbenzenes,
and compounds thereof which are alkylated in the nucleus and halogenated in the nucleus.

These and other suitable dihydroxyaryl compounds are described, for example, in U.S. Pat. Nos. 3,028,365; 3,148,172; 3,275,601; 2,991,273; 3,271,367; 3,062,781; 2,970,131 and 2,999,846; in DE-A 1 570 703; 2 063 050; 2 063 052; 2 211 0956; the French patent specification 1 561 518 and in the monograph "H. Schnell, Chemistry and Physics of Polycarbonates, Interscience Publishers, New York 1964".

Preferred dihydroxyaryl compounds are, for example:
4,4'-dihydroxydiphenyl,
2,2-bis-(4-hydroxyphenyl)propane,
2,4-bis-(4-hydroxyphenyl)-2-methylbutane,
1,1-bis-(4-hydroxyphenyl)cyclohexane,
1,1-bis-(4-hydroxyphenyl)-4-methylcyclohexane,
α,α'-bis-(4-hydroxyphenyl)-p-diisopropylbenzene,
α,α'-bis-(4-hydroxyphenyl)-m-diisopropylbenzene,
bis-(4-hydroxyphenyl)sulphone,
bis-(4-hydroxyphenyl)methane,
1,1-bis-(4-hydroxyphenyl)-3,3,5-trimethylcyclohexane,
bis-(2,6-bis-(4-hydroxyphenyl)hexafluoropropane,
(4-hydroxyphenyl)-1-phenylethane,
(4-hydroxyphenyl)diphenylmethane,
dihydroxydiphenylether,
4,4'-thiobisphenol,
bis-(4-hydroxyphenyl)-1-(1-naphthyl)ethane,
bis-(4-hydroxyphenyl)-1-(2-naphthyl)ethane,
dihydroxy-3-(4-hydroxyphenyl)-1,1,3-trimethyl-1H-inden-5-ol,
dihydroxy-1-(4-hydroxyphenyl)-1,3,3-trimethyl-1H-inden-5-ol,
2,2'3,3'-tetrahydro-3,3,3'3'-tetramethyl-1,1'-spirobi[1H-inden]-5,5'-diol.

Particularly preferred are
resorcinol,
bis-(4-hydroxyphenyl)-1-(1-naphthyl)ethane,
bis-(4-hydroxyphenyl)-1-(2-naphthyl)ethane,
2,2-bis-(4-hydroxyphenyl) propane,
α,α'-bis-(4-hydroxyphenyl)-p-diisopropylbenzene,
α,α'-bis-(4-hydroxyphenyl)-m-diisopropylbenzene,
1,1-bis-(4-hydroxyphenyl)cyclohexane,
bis-(4-hydroxyphenyl)-3,3,5-trimethylcyclohexane,
bis-(4-hydroxyphenyl)diphenylmethane.

More particularly preferred are
bis-(4-hydroxyphenyl)-3,3,5-trimethylcyclohexane,
4,4'-dihydroxydiphenyl,
2,2-bis-(4-hydroxyphenyl)propane.

A dihydroxyaryl compound of formula (I) with formation of homooligocarbonates as well as a plurality of dihydroxyaryl compounds of formula (I) with formation of cooligocarbonates may be used.

Diaryl carbonates are those diaryl esters of formula (II):

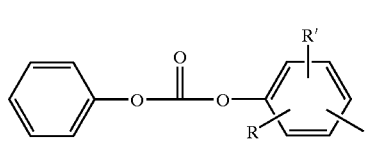

and formula (III):

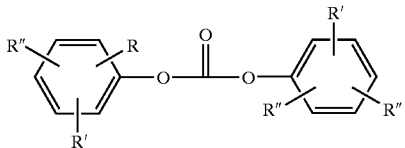

(III)

wherein R, R' and R", independently of one another, may be H, optionally branched $C_1$ to $C_{34}$ alkyl/cycloalkyl, $C_7$ to $C_{34}$ alkylaryl or $C_6$ to $C_{34}$ aryl, for example:
diphenylcarbonate,
butylphenyl-phenylcarbonate,
di-butylphenyl carbonate,
isobutylpheny-phenylcarbonate,
di-isobutylphenylcarbonate,
tert-butylphenyl-phenylcarbonate,
di-tert-butylphenylcarbonate,
n-pentylphenyl-phenylcarbonate,
di-(n-pentylphenyl)carbonate,
n-hexylphenyl-phenylcarbonate,
di-(n-hexylphenyl)carbonate,
cyclohexylphenyl-phenylcarbonate,
di-cyclohexylphenylcarbonate,
phenylphenol-phenylcarbonate,
di-phenylphenolcarbonate,
isooctylphenyl-phenylcarbonate,
di-isooctylphenylcarbonate,
n-nonylphenyl-phenylcarbonate,
di-(n-nonylphenyl)carbonate,
cumylphenyl-phenylcarbonate,
di-cumylphenylcarbonate,
naphthylphenyl-phenylcarbonate,
di-naphthylphenylcarbonate,
di-tert-butylphenyl-phenylcarbonate,
di-(di-tert-butyl phenyl)carbonate,
dicumylphenyl-phenylcarbonate,
di-(dicumylphenyl)carbonate,
4-phenoxyphenyl-phenylcarbonate,
di-(4-phenoxylphenyl)carbonate,
3-pentadecylpheny,-phenylcarbonate,
di-(3-pentadecylphenyl)carbonate,
tritylphenyl-phenylcarbonate,
di-tritylphenylcarbonate,
preferably,
diphenylcarbonate,
tert-butylphenyl-phenylcarbonate,
di-tert-butylphenylcarbonate,
phenylphenol-phenylcarbonate,
di-phenylphenolcarbonate,
cumylphenyl-phenylcarbonate,
di-cumylphenylcarbonate,
particularly, preferably, diphenylcarbonate.

In addition, the phenolic compounds used as carbonates may also be used directly as monohydroxyaryl compound in addition to one of the above-mentioned carbonates in order to influence the terminal groups of the oligocarbonate or the polycarbonate. A monohydroxyaryl compound of which the boiling point is higher than that of the monohydroxyaryl compound from which the diaryl carbonate has been formed should be selected. Preferred mixtures are those with diphenylcarbonate. There is the possibility of adding the monohydroxyaryl compound to the reaction at any moment, preferably at the start of the reaction, and the addition may be divided into a plurality of portions. The free monohydroxyaryl compound content may be 0.4 to 17 mol %, preferably 1.3 to 8.6 mol % (based on the dihydroxyaryl compound). Here the addition may be made both before the reaction and also completely or partially during the reaction.

The diaryl carbonates are used in 1.02 to 1.3 mol, preferably 1.04 to 1.25 mol, particularly preferably 1.06 to 1.20 mol, based on 1 mol dihydroxyaryl compound. Mixtures of the above-mentioned diaryl carbonates may also be used.

Ammonium or phosphonium catalysts, which for the purpose of this application are also jointly designated onium compounds, are used for the synthesis. They are preferably used in quantities of $10^{-8}$ to $10^{-3}$ mol, based on 1 mol dihydroxyaryl compound, particularly preferably in quantities of $10^{-7}$ to $10^{-4}$ mol.

Phosphonium salts, optionally in combination with other suitable catalysts, such as other onium compounds, alkali or alkaline-earth metal compounds, may be used as catalyst for the production of the oligocarbonates.

Phosphonium salts are those of formula (IV):

(IV)

wherein $R^{1-4}$, which may be the same or different, represent $C_1$ to $C_{10}$ alkyls, $C_6$ to $C_{10}$ aryls, $C_7$ to $C_{10}$ arylalkyls or $C_5$ to $C_6$ cycloalkyls, preferably methyl or $C_6$ to $C_{14}$ aryls, particularly preferably methyl or phenyl and $X^-$ may be an anion such as hydroxide, sulphate, hydrogen sulphate, hydrogen carbonate, carbonate, a halide, preferably chloride, or an alkoxide of formula OR, wherein R may be $C_6$ to $C_{14}$ aryl or $C_7$ to $C_{12}$ aralkyl, preferably phenyl. Preferred catalysts are tetraphenylphosphoniumchloride, tetraphenylphosphoniumhydroxide, tetraphenylphosphoniumphenolate, particularly, preferably, tetraphenylphosphoniumphenolate.

Preferred quantities of phosphonium salt catalysts are $10^{-8}$ to $10^{-3}$ mol per mol dihydroxyaryl compound and the most preferred quantities of catalyst are $10^{-7}$ to $10^{-4}$ mol per mol dihydroxyaryl compound.

Further co-catalysts may optionally be used in addition to the phosphonium salt in order to increase the polymerisation rate. These include salts of alkali metals and alkaline-earth metals, such as hydroxides, alkoxides and aryloxides of lithium, sodium and potassium, preferably hydroxide, alkoxide or aryloxide salts of sodium. Most preferred are sodium hydroxide, disodium bisphenolate and preferably sodium phenolate. The quantities of co-catalyst may be in the range of 1 to 2,000 ppb (parts per billion), preferably 5 to 1,000 ppb and most preferably 10 to 500 ppb, calculated as sodium respectively. These may be introduced during production of the oligocarbonates or else first added prior to polycondensation. These catalysts are effective until the conclusion of polycondensation.

Owing to the small amounts to be added, all catalysts are prepared and added as solutions. The monohydroxyaryl compound cleaved during polycarbonate synthesis is the preferred solvent.

The oligocarbonates may be deliberately branched and may therefore contain small quantities of 0.02 to 3.6 mol % (based on the dihydroxyaryl compound) of branching agents. Suitable branching agents include compounds suitable for polycarbonate production with three and more functional groups, preferably those with three or more than three phenolic OH groups, for example 1,1,1-tri-(4-hydroxyphenyl)ethane and isatinbiscresol.

The term "oligocarbonates" in the context of the present invention refers to condensates with a relative viscosity between 1.03 and 1.20, preferably between 1.06 and 1.15, particularly preferably between 1.06 and 1.10. The relative viscosity is shown as the quotient of the viscosity of the solvent and the viscosity of the oligomer dissolved in this solvent. It has been determined in dichloromethane at a concentration of 5 g/l at 25° C.

The oligocarbonates are the starting products for polycondensation to polycarbonates. Diaryl carbonates or dihydroxyaryl compounds may be added prior to condensation in order to correct the ratio of terminal phenolic OH groups to terminal aryl carbonate groups and deliberately achieve the desired and sought ratio of terminal groups or the concentration of terminal OH groups in the final polycarbonate. The terminal phenyl carbonate group may be partially altered by adding substituted monohydroxyaryl compounds, optionally also the diary carbonates thereof.

The oligocarbonates may be conveyed directly from their production process to the polycondensation reactor.

A further particular advantage is that the production of polycarbonates according to the invention does not have to be linked to the plant for producing the oligocarbonates. This allows polycarbonates to be produced at sites which do not have the typical infrastructure for constructing chemical plant. For this purpose, the solid oligocarbonate originating from a plant at a different site is melted in suitable units such as extruders and, optionally after addition of monomers to correct the ratio of terminal phenolic OH groups to terminal aryl carbonate groups and optionally catalysts to increase the reaction rate during polycondensation, is conveyed and condensed, for example in the polycondensation reactors according to the invention. The quantities of monohydroxyaryl compounds to be cleaved are small and do not pose any problems. Production of the diaryl carbonates and dihydroxyaryl compounds and production of the oligomer which are generally associated with high potential with respect to the environment, for example due to chlorine, carbon monoxide, phosgene, halogenated solvent, wastewater and large amounts of monohydroxyaryl compounds, may be carried out at different sites.

To modify the properties of the polycarbonates, auxiliaries and reinforcing agents may be added to the oligocarbonates prior to synthesis to high molecular polycarbonates. Examples of these include: heat and UV stabilisers, flow promoters, mould-release agents, flame retardants, pigments, finely dispersed minerals, fibrous material, for example alkyl and aryl phosphites, phosphates, phosphanes, low molecular carbonic acid esters, halogen compounds, salts, chalks, quartz powder, glass and carbon fibres, pigments and combinations thereof. Compounds of this type are described, for example, in WO 99/55772, pages 15 to 25 and in "Plastics Additives", R. Gächter and H. Müller, Hanser Publishers 1983.

The polycarbonates obtainable by the process according to the invention have relative viscosities of 1.18 to 1.40, preferably 1.18 to 1.36, particularly preferably 1.18 to 1.34. The relative viscosity is shown as the quotient of the viscosity of the solvent and the viscosity of the polymer dissolved in this solvent. They have been determined in dichloromethane at a concentration of 5 g/l at 25° C.

The invention is further illustrated but is not intended to be limited by the following examples in which all parts and percentages are by weight unless otherwise specified.

EXAMPLE

Oligocarbonate melt, produced from bisphenol A and diphenylcarbonate with tetraphenylphosphoniumphenolate catalyst, with a relative viscosity of 1,081, a terminal OH group content of 0.55% and a temperature of 270° C. are fed directly from their production process into a reactor, as described above, via a pressurising means. The reactor is heated to 270° C. and is under a vacuum of 7.3 mbar. The rotor speed is 2.5 rpm; the mean residence time 45 minutes. The product continuously removed from the reactor by a gear pump has a relative viscosity of 1.171 with a terminal OH group content of 0.13% and is conveyed via a heat exchanger heated with heat-carrying oil at 295° C. into a further reactor, as described above, but designed for higher melt viscosities. The vapour stream is partially condensed, the remainder being taken up in the vacuum station.

The second reactor is adjusted to 295° C. and is under a vacuum of 1.3 mbar. The rotor speed is 0.8 rpm; the mean residence time is 130 minutes. The vapours are diverted into the vacuum station. The polycarbonate continuously removed by means of a gear pump has a relative viscosity of 1.287 and a terminal OH group content of 290 ppm. The YI value is determined on the polycarbonate. It is 1.42.

YI was determined according to ASTM E 313 on injection moulded samples 4 mm thick. The injection temperature was 300° C.

Although the invention has been described in detail in the foregoing for the purpose of illustration, it is to be understood that such detail is solely for that purpose and that variations can be made therein by tose skilled in the art without departing from the spirit and scope of the invention except as it may be limited by the claims.

What is claimed is:

1. A process for producing polycarbonate comprising obtaining an oligocarbonate produced by transesterification of diaryl carbonate with dihydroxyaryl compound in the presence of catalysts and introducing the oliogocarbonate in molten state into a reactor that enables continuous formation of free films at a rate higher than 10, the reactor including a horizontal cylinder equipped with a heating jacket, at least one vapor outlet, a feed nozzle an outlet nozzle, a rotatable cylindrical basket having a cylindrical perforated wall and annular discs positioned at intervals around the periphery of said basket and along the length thereof, and means for rotating said basket, the interior of said basket including no central shaft, the diameter of the cylindrical basket corresponding to about ⅔ of the diameter of the horizontal cylinder, and said discs being formed of perforated sheet metal, said reactor operating under conditions calculated to promote polycondensation of the oligocarbonates to form polycarbonate.

2. The process of claim 1 wherein discs have a plurality of perforations the area of each hole being the area of a circle having a diameter A calculated as $A=x(\eta^2/(kg^2 m^{-5} s^{-2}))^{1/3}$, in which x is $2*10^{-3}3*10^{-2}$ and η denotes the kinematic melt viscosity of the melt in Pas.

3. The process of claim 2 wherein the solid webs between the perforations are square or rectangular in cross-section with constant dimensions per disc.

4. The process of claim 1 wherein reactor further contains scoop elements positioned in the low viscosity range.

5. The process of claim 1 wherein stators are positioned between the circular disk.

6. A reactor comprising a horizontal cylinder equipped with a heating jacket, at least one vapor outlet, a feed nozzle an outlet nozzle, a rotatable cylindrical basket having a cylindrical perforated wall and annular discs positioned at intervals around the periphery of said basket and along the length thereof, and means for rotating said basket, the interior of said basket including no central shaft, the diameter of the cylindrical basket corresponding to about ⅔ of the diameter of the horizontal cylinder, and said discs being formed of perforated sheet metal.

7. The reactor of claim 6 wherein The process of claim 2 wherein each annular discs includes solid webs between the perforations, said webs having square or rectangular cross-sections having identical dimensions therebetween.

8. The reactor of claim 6 wherein stators are positioned along inner wall of said horizontal cylinder and between the circular disk.

* * * * *